(12) United States Patent
Cairns

(10) Patent No.: US 6,315,461 B1
(45) Date of Patent: Nov. 13, 2001

(54) WET MATEABLE CONNECTOR

(75) Inventor: James L. Cairns, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 09/418,145

(22) Filed: Oct. 14, 1999

(51) Int. Cl.[7] .............................. G02B 6/36; G02B 6/00
(52) U.S. Cl. .................... 385/56; 385/75; 385/139; 385/53; 385/58; 439/131; 439/141
(58) Field of Search .................... 385/53, 55, 56, 385/58, 60, 70–72, 75, 94, 139; 439/131, 141

(56) References Cited

U.S. PATENT DOCUMENTS

| | | |
|---|---|---|
| 4,085,993 | 4/1978 | Cairns . |
| 4,373,767 | 2/1983 | Cairns . |
| 4,411,491 | 10/1983 | Larkin et al. . |
| 4,606,603 | 8/1986 | Cairns . |
| 4,616,900 | 10/1986 | Cairns . |
| 4,666,242 | 5/1987 | Cairns . |
| 4,795,359 | 1/1989 | Alcock . |
| 4,948,377 | 8/1990 | Cairns . |
| 5,125,056 * | 6/1992 | Hughes et al. .................... 385/59 |
| 5,171,158 | 12/1992 | Cairns . |
| 5,194,012 | 3/1993 | Cairns . |
| 5,203,805 | 4/1993 | Cairns . |
| 5,685,727 | 11/1997 | Cairns . |
| 5,738,535 | 4/1998 | Cairns . |

* cited by examiner

*Primary Examiner*—Akm E. Ullah
*Assistant Examiner*—Sarah N Song
(74) *Attorney, Agent, or Firm*—Brown, Martin, Haller & McClain, LLP

(57) ABSTRACT

An underwater connector has mateable plug and receptacle units each containing a member having an internal chamber enclosing a contact element when the units are unmated. The members each have a resilient forward end portion with an opening communicating with the chamber, and a forward end face in sealing engagement with the corresponding end face of the other member to provide a seal when the units are mated. An actuator in each unit compresses the forward end portion of each member to close and seal the opening, and the arrangement is such that the forward end portions move away from the actuators and open as the units are mated, to permit one contact element to pass into the member of the other unit for connection to the other contact element. The forward end portions of the members are self-sealing in both the mated and unmated condition, requiring no additional seal elements.

29 Claims, 7 Drawing Sheets

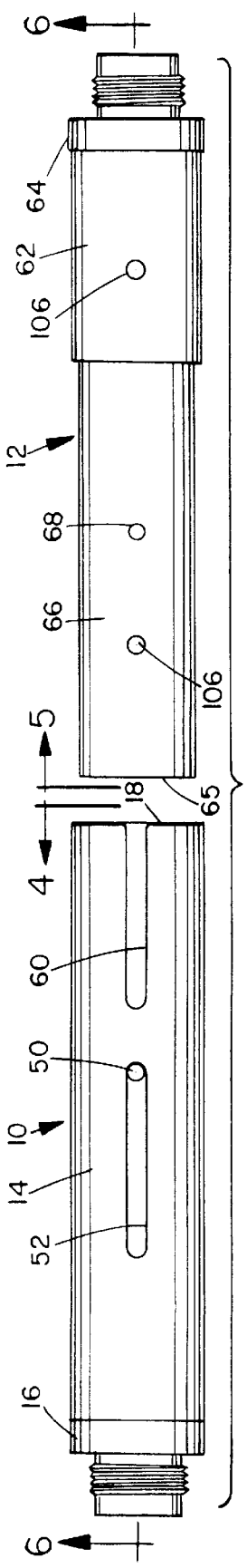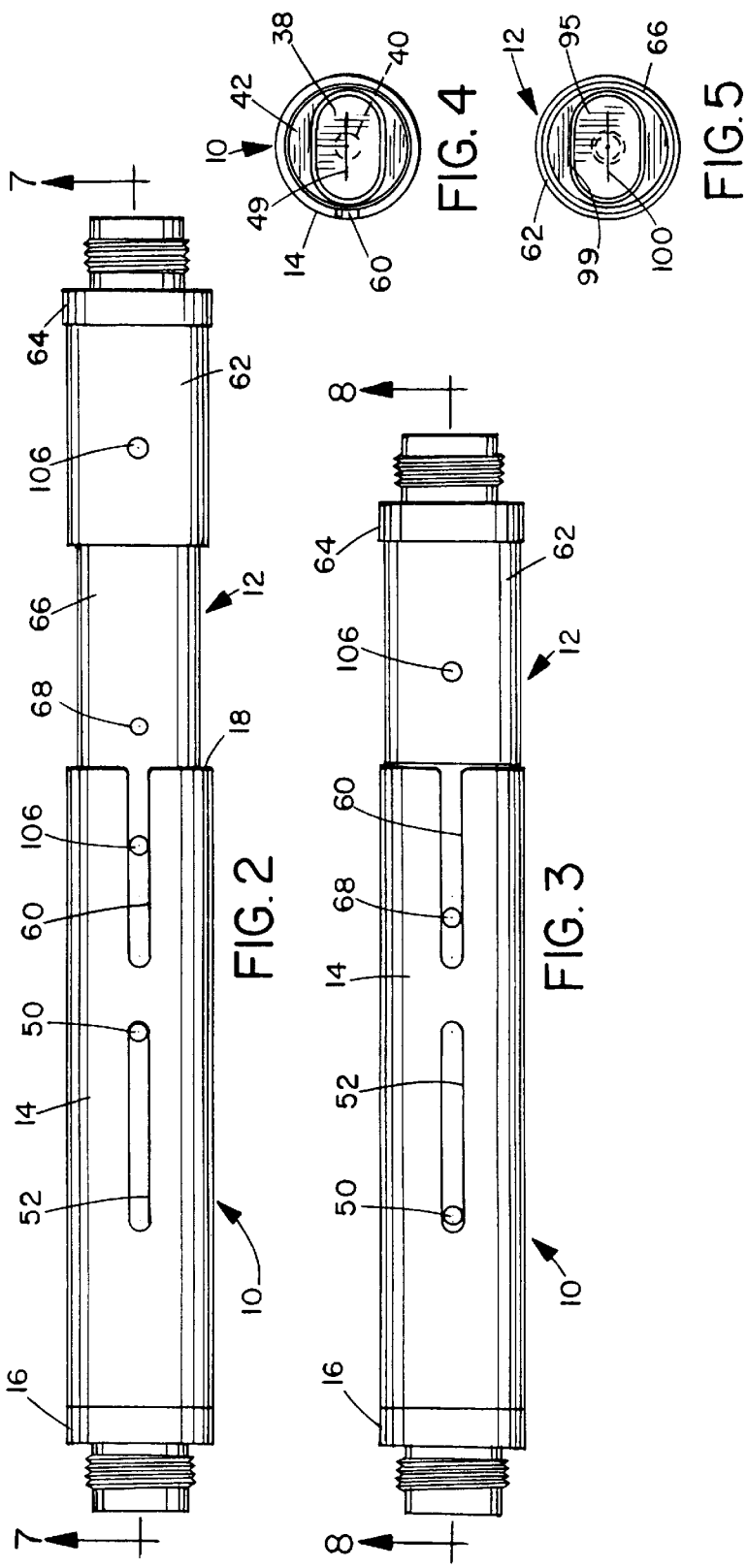

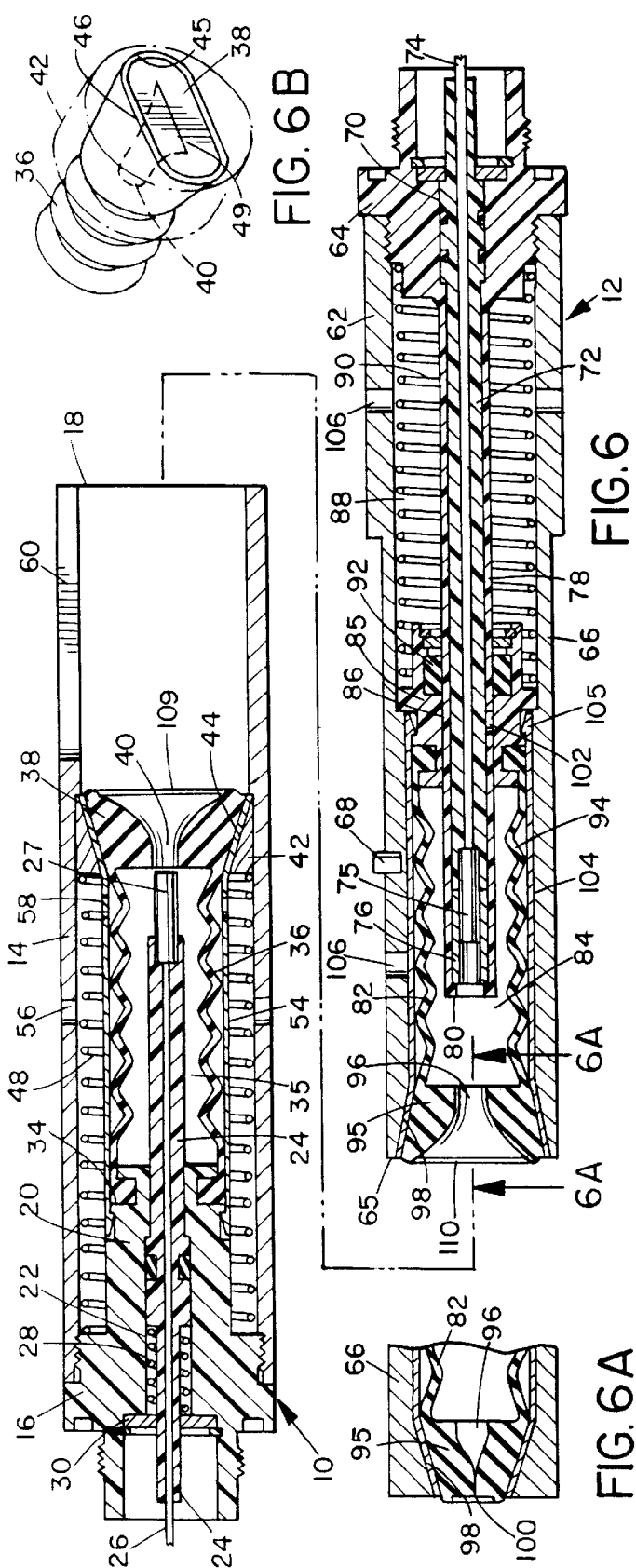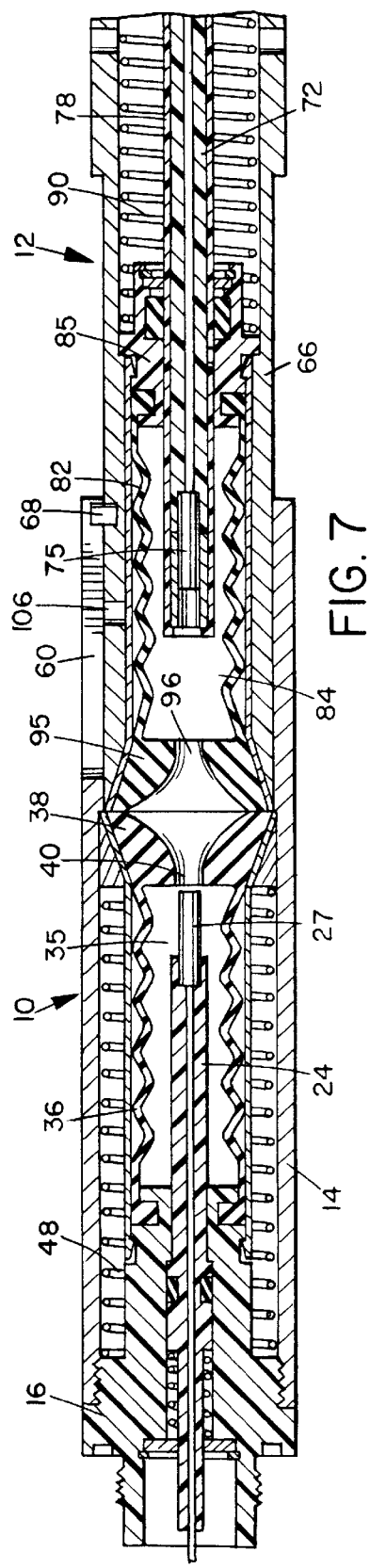

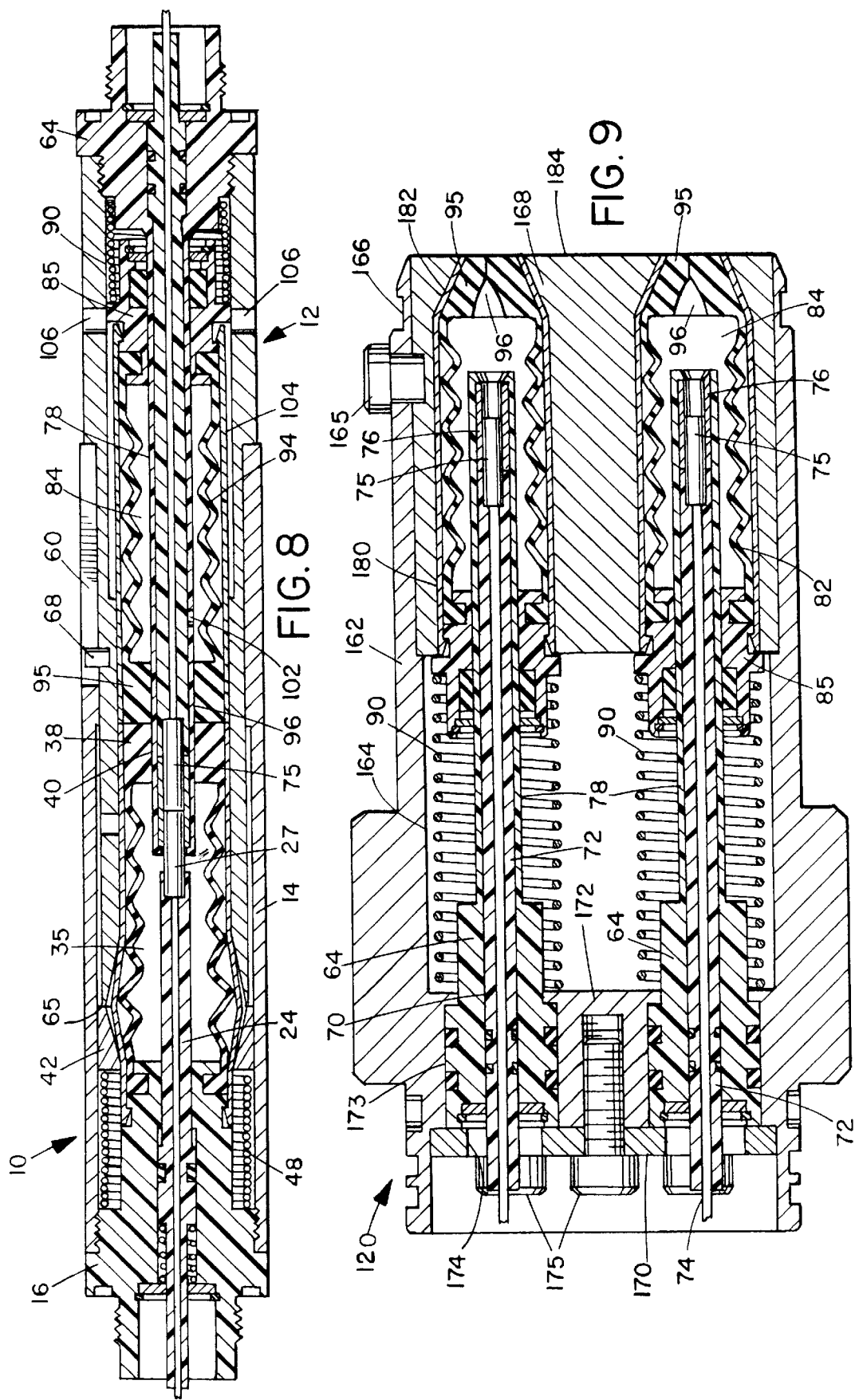

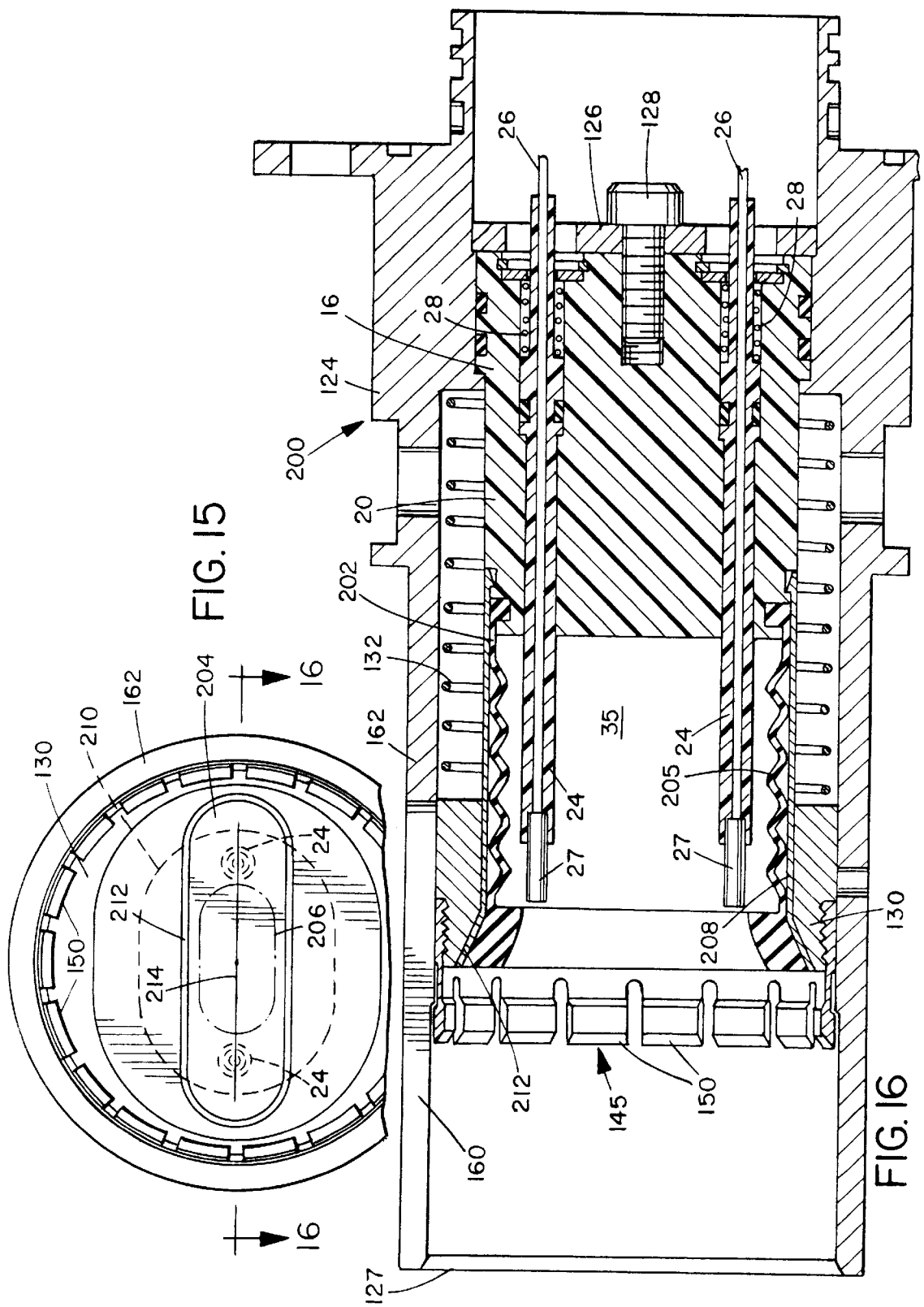

WET MATEABLE CONNECTOR

BACKGROUND OF THE INVENTION

This invention relates to a connector for making connections of fiber-optic, electrical, and hybrid electro-optical cables in a hostile or underwater, high pressure environment.

There are many types of connectors for making electrical and fiber-optic cable connections in hostile or harsh environments, such as undersea connectors which can be repeatedly mated and demated underwater at great ocean depths. Such underwater connectors typically comprise a plug unit containing one or more contact probes and a receptacle unit containing an equivalent number of contacts or junctions for engagement with the contact probes, which extend into the receptacle unit when the units are connected together. Typically, the contacts or junctions are contained in a sealed chamber containing optically clear dielectric fluid, and the probes enter the container via one or more openings which are sealed when the units are separated. One major problem in designing such units is the provision of seals which will adequately exclude seawater and other contamination from the contact chamber even after repeated mating and demating, and also prevent fill fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. On mating, the contact probe is forced through the opening and the sphincter pinches against the probe to form a seal. Although this type of seal is successful in some cases, it does have disadvantages. One disadvantage is that this seal does not work well under all hostile conditions. Another disadvantage is that such seals tend to lose their "memory" after repeated mating and demating, so that they may fail to close completely, or may not close quickly enough to isolate the chamber from the surrounding environment when the units are demated. Another type of known seal mechanism comprises a piston which moves axially into the seal opening as the units are demated.

In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and demating.

Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns. These overcome some of the reliability problems of penetrable seals, for example, but can be too complex for miniaturized connectors.

SUMMARY OF THE INVENTION

It is an object of the present invention to provide a new and improved connector for making connections between optical fiber cables, electrical cables, or hybrid electro-optical cables in hostile environments, such as underwater.

According to the present invention, an underwater connector is provided which comprises a plug unit having a forward end, a rear end, and a hollow body, a first member mounted in the hollow body and forming an internal chamber, the member having a resilient forward end portion having an opening communicating with the internal chamber, at least one probe contact member mounted in the chamber in alignment with the opening, a receptacle unit having a hollow body, a forward end, and a rear end and adapted for releasable mating engagement with the plug unit, a second member mounted in the hollow body of the receptacle unit and having an internal chamber and a resilient forward end portion having an opening communicating with the internal chamber, and at least one receptacle contact member in the chamber in alignment with the opening, the resilient forward end portions of the first and second members having forward end faces in face-to-face sealing engagement when the units are mated together, the plug and receptacle units each having an actuator for compressing the resilient end portion of the respective member to close and seal the respective opening when the units are unmated, and for opening the openings when the plug and receptacle units are mated together with the end faces in sealing engagement, whereby at least one of the probe and receptacle contact members can pass through the aligned openings in the resilient end portions of the members to engage the other contact member.

In a preferred embodiment of the invention, the actuator is designed to force the member openings to open when the end faces are in sealing engagement. In one embodiment, the actuator has a shaped throat designed such that the resilient end portions of the members are constricted in one direction when the units are mated, forming an elongated shape with a slit-like closure. When the units are connected together, the members travel through the actuator throats into a position in which they are compressed in a perpendicular direction, forcing the openings to open. The actuator throat may be of gradually tapering, oval shape in order to compress the resilient end portions and close the openings, with an adjacent region of circular cross section which will compress the outer ends of the elongated end portions and force them back into a circular shape, forcing the openings back into an open configuration.

Preferably, one of the actuators is slidably mounted in the respective body of a first one of the plug and receptacle units and movable between an extended position in which the tapered throat engages the respective member end portion to squeeze the opening shut, and a retracted position in which the throat is pushed back over the end portion and the adjacent portion forces the opening to open. The member in the other, second unit is also slidably mounted for movement between an extended position in which the resilient end portion is engaged in the actuator throat and the opening is squeezed shut, and a retracted position in which the resilient end portion is retracted from the actuator throat and forced to open by an adjacent, circular part of the actuator. In operation, the end of the second unit engages the slidable actuator in the first unit to push it back as the two units are secured together. At the same time, the end of the member in the first unit engages the end of the retractable member in the second unit, pushing it back into the retracted position so that both member openings are forced open. The contact element in the second unit travels through the open ends of the members to contact the corresponding contact element in the first unit.

In one embodiment of the invention, each actuator has a through bore having a forward end, and an inwardly tapering throat portion extending up to the forward end to squeeze the opening of the resilient end portion of the respective first or second member into the sealed and closed condition. The throat portion is preferably of oval, tapering cross-section up the forward end, and has opposing flat sides for squeezing the respective opening into a slit-like closure. The throat portion on one unit may be formed integrally or secured in the hollow body of the unit, while the other unit has a separate throat member slidably mounted in the body and biased into the extended position. Instead of forming the actuator as an inwardly tapered, oval bore or throat, alternative actuator mechanisms such as leaf springs or the like may be provided for squeezing the openings shut.

The connector may be a single circuit connector with a single contact probe on one side for contact with a single contact on the other side, or may be a multiple contact connector with electrical, optical, or both electrical and optical contacts to form a hybrid electro-optical connector. In the latter case, both the plug and receptacle units may have multiple members forming chambers for the respective contact elements, and actuators for squeezing the end portions of the respective members closed when the units are disconnected. Alternatively, multiple circuits could be grouped within one member which is opened and closed by a single actuator.

This invention avoids the need for complex rolling seal or stopper arrangements for sealing the connector, and is of much simpler construction than previous underwater connectors. All that is required in this invention is a simple opening in a resilient end portion of the contact chamber, which is pinched closed in one position, and pushed away from the pinching device in a second position so that it is forced open.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which:

FIG. 1 is a side view illustrating a connector according to a first embodiment of the invention, with the two connector units separated;

FIG. 2 is a side view with the units initially interconnected;

FIG. 3 is a side view with the units fully connected;

FIG. 4 is an end view in the direction of arrow 4 in FIG. 1;

FIG. 5 is an end view in the direction of arrow 5 in FIG. 1;

FIG. 6 is an enlarged sectional view taken on line 6—6 of FIG. 1;

FIG. 6A is a section on the lines 6A—6A of FIG. 6;

FIG. 6B is a partial perspective view of an end portion of one of the sleeve members in the closed and sealed condition, with the sealing actuator or throat in dotted outline;

FIG. 7 is an enlarged sectional view taken on line 7—7 of FIG. 2;

FIG. 8 is an enlarged sectional view taken on line 8—8 of FIG. 3;

FIG. 9 is a sectional view similar to a portion of FIG. 1, but showing a multiple connector receptacle module;

FIG. 15 is an end view of an alternative multiple connector plug module; and

FIG. 16 is an enlarged sectional view taken on line 16—16 of FIG. 15.

DESCRIPTION OF THE PREFERRED EMBODIMENTS

Figure 10:
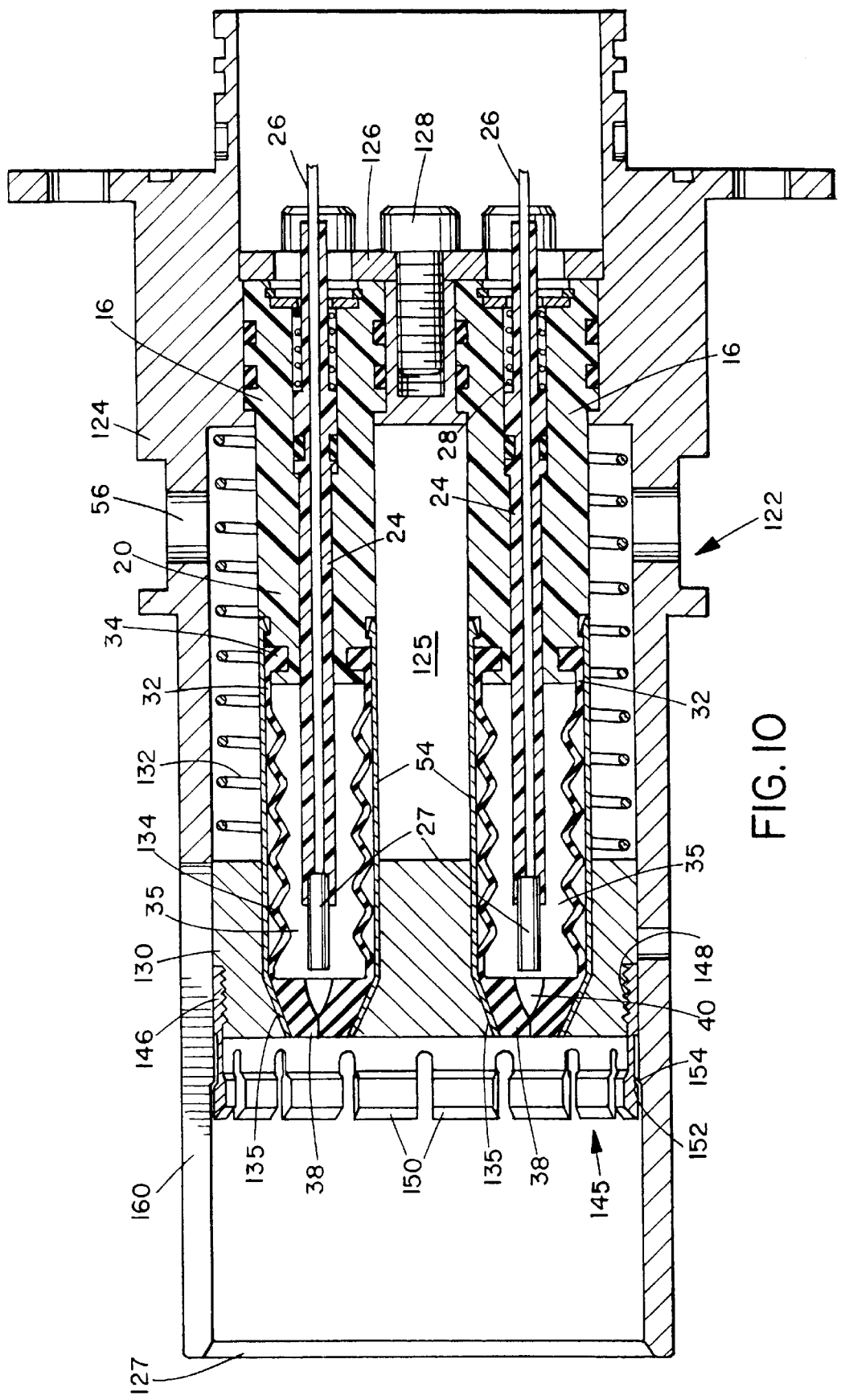
FIG. 10 is a similar sectional view showing the multiple connector plug module.

FIGS. 1 to 8 of the drawings illustrate a single circuit underwater optical connector according to a first embodiment of the present invention. Although the connector of FIGS. 1 to 8 is shown as connecting two optical fibers with suitable end connectors or contacts, it will be understood that the connector may be modified to make an electrical cable connection in an equivalent fashion.

The connector comprises a plug unit 10 and a receptacle unit 1 2 which are designed for releasable mating engagement to form a connection as illustrated in FIGS. 3 and 8. The units are shown separated in FIGS. 1 and 6. Plug unit 10 basically comprises a hollow outer body or shell 14 of rigid material having a sealed rear end wall or end plug 16 and an open forward end 18.

End plug 16 has a cylindrical projection 20 extending into the shell 14 and having a through bore 22. A tubular housing 24 extends through bore 22 and into the hollow body of shell 14. An optical fiber 26 extends through the bore in housing 24 and is terminated to an alignment ferrule or contact probe 27 at the end of housing 24 in a conventional manner. Housing 24 is slidably mounted in bore 22 and is biased into the extended position of FIG. 6 by spring 28 acting between an end plate 30 and a shoulder formed on housing 24, to apply biasing force to the connection.

A bladder or sleeve member 32 of resilient material has a rear end 34 sealed to the projection 20, and projects forwardly from projection 20 towards the forward end of the shell 14. The sleeve member 32 forms an internal, fluid-filled chamber 35 in which the probe or ferrule 27 is located when the units are separated as in FIG. 6. The sleeve member has a relatively thin-walled, corrugated or bellows-like portion 36 extending along the majority of its length, for allowing expansion or contraction as required for pressure and volume compensation, and terminates in a thick walled, resilient end portion 38 of cylindrical shape having an aperture or opening 40 communicating with chamber 35.

Opening 40 could take a variety of shapes, but in the present configuration it is of circular cross-section when the end portion 38 is released or unbiased. Opening 40 is squeezed shut by an outer actuator member 42 slidably mounted in shell 14 when in the position illustrated in FIGS. 6 and 6B. Actuator member 42 is of suitable rigid material, and is ring-shaped with an inwardly tapered through bore 44 of oval cross-section which terminates in an oval opening 45 having opposite straight sides 46, as best illustrated in FIGS. 4 and 6B. Member 42 is biased into the extended position of FIG. 6 by spring 48. Outer actuator member 42 has a radially outwardly projecting pin or stud 50 which engages in an axially extending keying slot 52 in shell 14 for alignment purposes when it slides back and forth between the extended position of FIGS. 1 and 6 and the retracted position of FIGS. 3 and 8, as the units are repeatedly mated and unmated. The straight, inwardly tapered side walls of bore 44 will squeeze the opening 40 shut so that it is sealed forming a sealed, straight slit 49 at the outer end of portion 38 when the plug unit is in the unmated position of FIG. 6.

An outer cylindrical protective sheath or cover 54 is secured over bladder or sleeve member 32. Sheath 54 is snap-engaged over the projection 20 at one end and bonded to the forward end portion 38 of member 32 at the opposite end. Sheath 54 is designed to hold the bellows-like portion of the bladder or sleeve member erect, to resist axial collapse as the units are mated, and also provides an outer, slippery surface for smooth sliding movement of actuator ring 42 over the sleeve member, as will be described in more detail below. Sheath 54 is of any suitable material which is more resilient in one direction than another. The material is radially resilient but has axial strength to resist compression in an axial direction but permit radial compression, similar to a drinking straw. One suitable material for sheath 54 is Hytrel® manufactured by DuPont Corporation, Wilmington, Del.

The interior of shell 14 communicates with the external environment via openings 56. An opening 58 is provided in sheath 54 to communicate with the exterior of sheath 54, so that the interior of sheath 54 also communicates with the external environment. The bellows portion 36 of the flexible sleeve or bladder 32 will provide pressure compensation between the pressure of fluid inside chamber 35 and the pressure of fluid outside the sleeve 32, i.e. the external environment. Shell 14 also has an axial keyway or slot 60 extending inwardly from its outer end 18, for proper alignment when mating with the receptacle unit 12, as described in more detail below.

The mating receptacle unit 12 also has a rigid outer shell 62 with a rear end plug or closure 64 of metal or rigid plastic material and an open forward end 65. The shell 62 has a reduced diameter forward portion 66 for telescopic sliding engagement in the shell 14 of plug unit 10 as the units are mated together, as best illustrated in FIGS. 1 to 3 and 6 to 8. A radially outwardly projecting key pin 68 on shell 62 engages in keyway 60 of shell 14 as the units are mated together, to ensure proper alignment of the units. Any suitable coupling device (not illustrated) may be provided for releasably a securing the units together in their mated condition (FIGS. 3 and 8). Both shells 14,62 have rear ends which are suitably threaded as illustrated or provided with securing devices for securing each unit to an optical cable carrying an optical fiber.

End plug 64 has a through bore 70 and a tubular housing or optical stem 72 for optical fiber 74 extends through bore 70 and into shell 62. Fiber 74 terminates to an alignment ferrule 75 secured in a seat at the outer end of the housing 72. A contact alignment sleeve 76 projects forwardly from the seated ferrule 75 for receiving the mating ferrule or probe 27 when the units are mated together. A tubular extension 78 from the base or end plug 64 extends over tubular housing 72 and sleeve 76, with a lip 80 engaging over the end of sleeve 76. The principal function of extension 78 with lip 80 is to loosely retain sleeve 76 in position. As a secondary function, it provides better rigidity and alignment of the optical stem. In the mated connector, the end portions 38, 95 of the bellows seal the mated chambers by the spring-loaded face-to-face pressure which holds them tightly together. In some applications it may be desirable to provide secondary sealing to the member(s) that pass through them. In this second case, seals may be provided on the housing or optical stem. Without extension 78, such seals may apply radial forces to the junction, potentially causing optical misalignment and loss of signal. The tubular supporting extension 78 reduces the risk of such misalignment.

A flexible bladder or sleeve member 82 forms a chamber 84 enclosing the forward end of the optical stem 72 and tubular extension 78. Bladder 82 has a rear end secured to a rigid base member 85 which has a through bore 86 slidably engaged over tubular extension 78. Base member 85 is slidably engaged in a rear end portion of a chamber 88 formed by shell 62, and is biased into the extended position of FIG. 6 by spring 90 acting between end plug 64 and base member 85. A sliding seal 92 is provided between base member 85 and tubular extension 78 to seal the rear end of the chamber 84 in bladder 82.

Bladder 82 is of equivalent design to the bladder 32 in the plug unit. It has a thin-walled, flexible portion 94 of bellows-like shape extending along the majority of its length from the base member 85 towards the forward end. A forward end portion 95 of the bladder 82 is of cylindrical shape and has a thickened wall with a through bore or aperture 96 communicating with chamber 84. Through bore 96 is of circular cross section when end portion 95 is not compressed or squeezed inwardly. However, when the bladder 82 is in the fully extended position of FIG. 6, the forward end portion 95 is engaged in a shaped throat portion 98 formed at the forward end of shell 62, as best illustrated in FIGS. 6 and 6A. The throat portion has a generally oval-shaped through bore of constant cross-sectional area and gradually tapering dimensions terminating in an oval slot-like end opening 99 (see FIG. 5). The tapering oval throat portion squeezes the end portion 95 inwardly so that opposing parts of the bore 96 are pressed against one another to seal the bore and form a generally slit-shaped closure 100, as best illustrated in FIGS. 5 and 6A. This seals the chamber 84 when the units are unmated. Chamber 84 is filled with a suitable, optically clear fluid (or dielectric fluid in case of electrical junctions). A hole 102 in tubular extension 78 allows communication of fluid to the optical stem. It also provides free fluid communication between chambers in the mated condition.

As in the plug unit, an outer sheath or tubular cover 104 extends over flexible bladder 82 to hold the flexible bellows portion 94 of the bladder erect so that it will not collapse as the units are secured together. The sheath 104 is of the same material as sheath 54 in the plug unit. The sheath 104 has an inwardly projecting rim or lip 105 at its rear end which is snap engaged in an annular groove in base member 85. The forward end of the sheath is bonded to the outer surface of the forward end portion 95 of the bladder.

Openings 106 in shell 62 and an opening (not illustrated) in sheath 104 provide communication between the interior of sheath 104 and the external environment. The flexible bellows portion 94 of the bladder 82 will flex inwardly or outwardly to provide pressure compensation between the pressure of fluid in chamber 84 and the pressure of fluid outside bladder 82.

The plug and receptacle units 10, 12 are shown separate and in an unmated condition in FIGS. 1 and 6. In this condition, each chamber 35,84 containing the optical contacts is sealed and the forward end portion 38,95 is squeezed shut by the inwardly tapering wall portions of the throat portions 44,98 of actuator ring 42 and the forward end of shell 62, respectively. Opposing surfaces of the bores through forward end portions 38 and 95, respectively, are thereby pressed against one another to form a reliable seal, as best illustrated in FIGS. 4,5,6A, and 6B. The front end wall 109,110 of each forward end portion 38,95 is shown here flat, but other shapes may be used.

As the units 10,12 are brought together, the flat front end walls 109,110 of the forward end portions of each bladder will first engage, as indicated in FIG. 7. The face-to-face engagement between the resilient end walls will form a seal. At the same time, the forward end 65 of shell 62 engages the forward end of the slidable actuator ring 42. As the receptacle unit 62 continues to be urged inwardly beyond the position illustrated in FIG. 7, the forward end 65 of shell 62 will push actuator ring 42 inwardly, compressing spring 48 and causing the ring to slide over end portion 38. At the same time, the forward end of portion 38 of bladder 32 will push against the opposing forward end portion 95 of bladder or sleeve 82, causing the base member 85 and bladder to slide inwardly as a unit, compressing spring 90, which acts to bias the end faces 109,110 into close, sealing engagement. At the same time, both the forward end portions 38 and 95 will slide completely through throat portion 98 at the forward end of shell 62 and into round or circular portions of the shell, forcing the bores or apertures 40,96 to expand into the circular condition as indicated in FIG. 8. When end portions 38,95 are each engaged in the tapering throat portions 44,98, they are compressed into an elongated, oval shape having a longer dimension in the direction of the slit-like closure (see FIG. 6B). The longer dimension in this configuration is greater than the diameter of the adjacent, circular portion of the shell 12 into which the end portions 38,95 slide as the units are mated. The ends of the oval end portions are thus pushed inwardly on entering the circular portion adjacent the throat, forcing the respective openings to open.

Although the activation of the sealing end portions of the respective sleeve members is accomplished in the illustrated embodiment by changing from an elongate, oval configuration to a circular configuration, other shapes may alternatively be used to achieve the same objective, with the sealing end portions being compressed one way to close the opening, and in another direction to force it to open. This provides positive opening of the end seals to allow an optical or electrical connector to pass through, without requiring any sealing against the seal penetrating element, in view of the end-to-end sealing engagement between the flat end faces of the sleeve members. Although the end faces are flat in the illustrated embodiment, other end face shapes may alternatively be used, such as opposing convex faces which are compressed, or mating concave and convex faces.

The mating forward end portions of each of the bladders will also slide rearwardly over the tubular extension 78 of optical stem 72, and the alignment sleeve 76 will engage over ferrule 27, bringing the two optical ferrules 27,75 into face-to-face engagement, as illustrated in FIG. 8. Biasing spring 28 acting on the optical stem or housing 24 will ensure good face to face contact between the end faces of the ferrules. At all times, the two optical chambers 35,84 will be completely sealed and isolated from the external environment by the face-to-face engagement between the resilient end faces of portions 38 and 95. When the plug and receptacle units are disconnected, the process is reversed, with the spring 48 biasing the actuator ring 42 outwardly as the shell 62 is retracted, until it again engages over the end portion 38 of chamber and squeezes the through bore or aperture 40 closed. At the same time, the base member is urged outwardly by spring 90 as the end portion 95 is retracted away from the end portion 38 of the chamber 35, until it again engages with throat portion 98, which squeezes through bore 96 into the closed and sealed condition. The end faces 109,110 will be biased into face-to-face sealing engagement until the end portions are engaged in the respective throat portions and sealed, ensuring that the optical chambers are sealed at all times.

This arrangement is considerably simpler than prior art connector unit sealing arrangements, and is particularly suitable for single circuit electrical or optical connectors or miniaturized single or multiple contact connectors. It does not require anything protruding into the chamber end openings to seal them, nor any rotating seal members or external actuators to operate such seal members. All that is required is a suitable mechanism for opening and closing the chamber end faces. The resilient end portion of each optical chamber is simply squeezed shut when the units are unmated, and forced to open when the units are mated. The end seal portion thus is sealed shut by means of opposing portions of the opening being squeezed against each other when unmated, and the end faces seal against one another when mated, requiring no additional seal elements. The actuator for squeezing each chamber end face shut in the illustrated embodiment is a shaped, tapering, oval-shaped throat, and the end faces are designed to move through and away from the throats as the units are mated together, while being held in sealing, face-to-face engagement as their apertures open to allow the optical contact or contacts to pass through.

Other actuators may alternatively be provided for squeezing the chamber end faces closed in place of the shaped throats. For example, the flat sides of the oval-shaped end of each throat may be replaced with leaf springs for biasing the end faces closed. Additionally, instead of the sleeve members and sealing end portions being formed integrally as in the illustrated embodiment, separate end seals or collars of equivalent shape and dimensions may alternatively be used.

FIGS. 9 to 14 illustrate the same chamber sealing arrangement as in FIGS. 1 to 8 applied to a multiple circuit underwater connector. In the illustrated embodiment, the connector of FIGS. 9 to 14 connects multiple optical fibers, but it may alternatively comprise an electrical connector or a hybrid electro-optical connector. A four-way connector is illustrated by way of example, but it will be understood that the connector may readily be modified for making a greater or lesser number of connections, depending on the application.

The connector basically comprises a receptacle unit 120 for releasable mating engagement with a plug unit 122. The receptacle and plug units are illustrated in detail in FIGS. 9 and 10, respectively. Each optical chamber and optical stem in the plug and receptacle units 122,120 is formed in the same way as the single optical chamber and stem of FIGS. 1 to 8, and like reference numerals have been used for like parts as appropriate.

As illustrated in FIG. 10, plug unit 122 basically comprises an outer shell 124 having an internal chamber or bore 125, a rear end plate 126, and an open forward end 127. A plurality of openings corresponding in number to the number of optical connections to be made are provided in rear end plate 126, and a plurality of bases or end plugs 16 are secured in the respective openings by means of end plate 126 secured in position via mounting screws 128, as best illustrated in FIG. 10. As with the single connector plug unit of FIG. 6, each end plug 16 of plug unit 122 has a cylindrical projection 20 extending into chamber 125 and having a through bore 22. A tubular housing 24 extends through each bore 22 and forwardly towards the open forward end of shell 124. Optical fibers 26 extend through each of the housings 24 and are each terminated to alignment ferrule or probe 27.

A cylindrical actuator or plug member 130 is slidably mounted in bore 125 and is biased by spring 132 into the fully extended position illustrated in FIG. 10. Actuator member 130 has an array of spaced through bores 134 each aligned with a respective one of the tubular housings 24. A series of bladders or sleeve members 32 each identical to the sleeve member 32 of FIG. 6 are mounted on the respective end plugs 16 to form sealed chambers surrounding the respective optical fiber housings. Each sleeve member 32 has an inwardly projecting, annular lip 34 at its rear end sealed in an annular groove in the respective projection 20. The forward end portion 38 of each member 32 has a thick, resilient cylindrical wall with a circular through bore 40. An outer cylindrical protective sheath or cover 54 extends over each sleeve member 32. One end of sheath 54 is secured to forward portion 38 and extends rearwardly over the thin-walled bellows portion 36. The opposite end has an annular rim which snap engages over an indent in the respective cylindrical projection 20.

The forward end portion 38 of each sleeve member 32 is slidably engaged in a respective bore 134. Each bore 134 has an inwardly tapered throat portion 135 terminating in an oval opening having opposite straight sides, as in the previous embodiment. When actuator member 130 is biased into the extended position of FIG. 10, the tapered throat portion of each bore 134 will squeeze the wall of each forward end portion 38 inwardly, shutting and sealing off the through bore 40 so that the forward end of each chamber 35 is sealed against ingress of sea water or the like.

A locking collet 145 is preferably provided on actuator member 130, as described in co-pending application Ser. No. 08/993,730, the contents of which are incorporated herein by reference. The locking collet is a generally cylindrical ring member with internal screw threads 146 at one end which are threaded onto corresponding threads 148 at the outer end of actuator member 130. A series of spaced, resilient fingers 150 are provided at the forward end of collet 145. Bore 125 has a step or shoulder 154 defining a reduced diameter portion of the bore. Shoulder 154 causes collet 145 to close down during mating. The larger diameter beyond shoulder 154 allows the collet to open on unmating, releasing the mating connector.

Outer shell 122 has a keying slot 160 projecting inwardly from its outer end, as well as holes 56 for communication with the external environment. Holes (not illustrated) are also provided in each sheath, as in the previous embodiment, so that the interior of each sheath 54 communicates with the external environment and the bellows portion of each sleeve member can provide pressure compensation between the fluid pressure in each chamber 35 and the pressure outside the chamber.

The receptacle unit 120 is illustrated in FIG. 9 in the unmated condition. The mating receptacle unit 120 also has a rigid outer shell 162 and internal through bore 164. A radially projecting key pin or bolt 165 engages in slot 160 in the plug shell 122 to ensure proper alignment when the parts are secured together. An outer annular groove 166 adjacent the forward end of shell 162 is designed for releasable snap engagement with the fingers 150 on collet 145, as described in more detail below.

Figure 11:
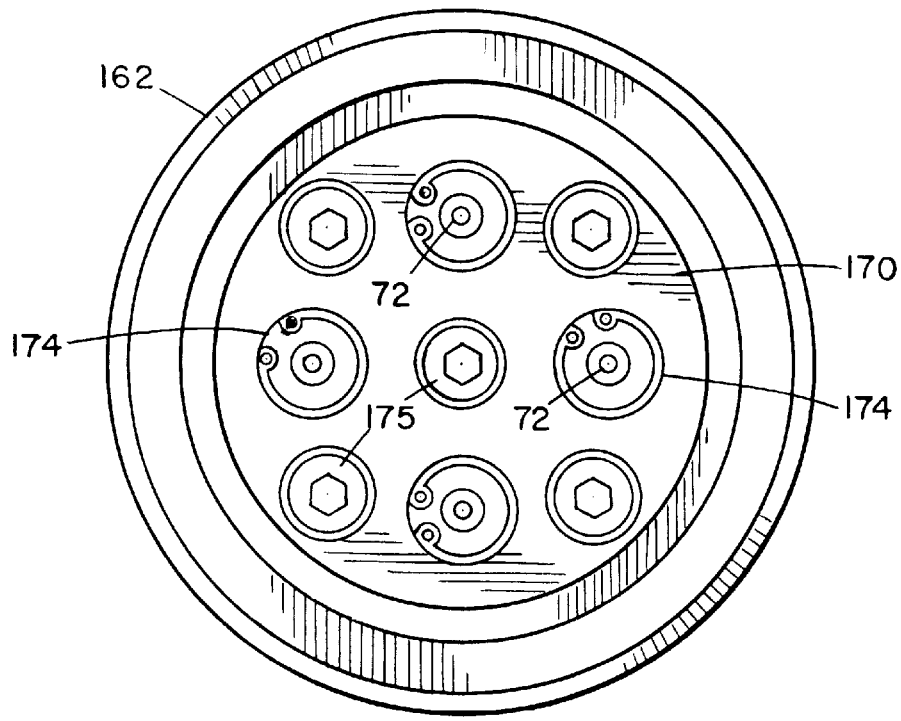
FIG. 11 is a left hand end view of the module of FIG. 9.

A rigid forward end plug or manifold 168 is secured in the forward end of bore 164, while rear end plate 170 is mounted over the rear end wall 172 of the bore. A plurality of aligned openings 173,174 corresponding in number to the number of optical connections to be made are provided in rear end wall 172 and plate 170, and a plurality of bases or end plugs 64 are secured in the respective openings via end plate 172 which is secured to wall 172 via screws 175, as illustrated in FIGS. 9 and 11. As with the single connector receptacle unit of FIG. 6, each end plug 64 of receptacle unit 120 has a through bore 70. A tubular housing 72 extends through each bore 70 and forwardly towards the forward end of shell 162. Optical fibers 74 extend through each of the housings 72 and are each terminated to alignment ferrule or probe 75. A contact alignment sleeve 76 projects forwardly from the probe 75 for receiving the mating ferrule or probe 27 when the units are mated together.

As in the previous embodiment, a flexible bladder or sleeve member 82 forms a chamber 84 enclosing the forward end of the optical stem and ferrule. The rear end of each bladder is secured to base member 85 which is slidably mounted over the respective housing or stem 72, and member 85 is biased forwardly into the extended position of FIG. 9 via spring 90.

Figure 12:
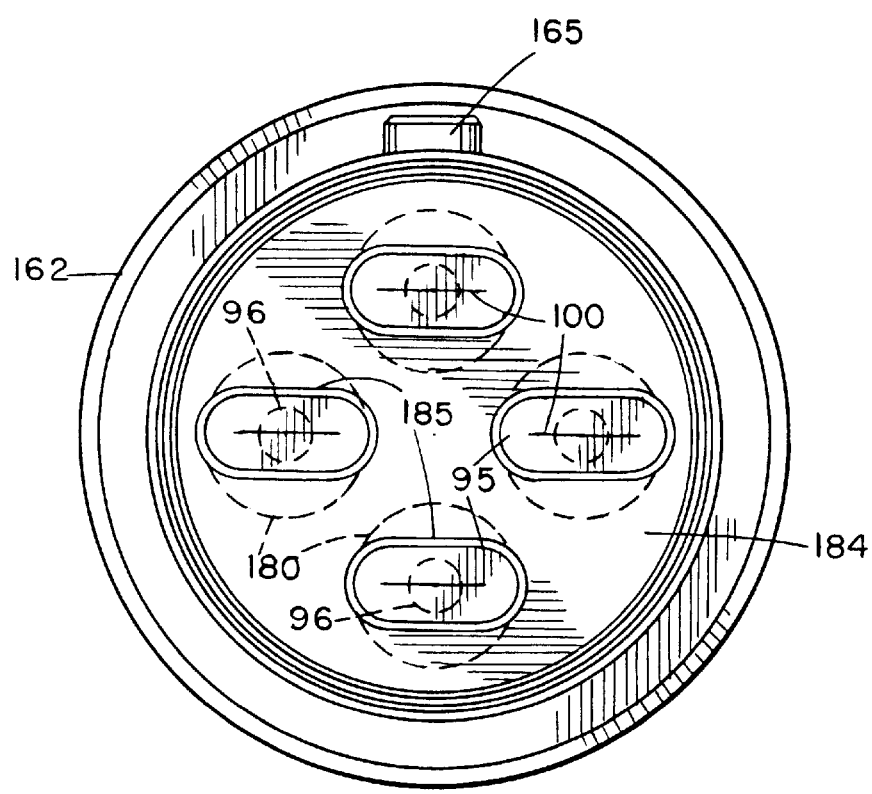
FIG. 12 is a right hand end view of the module of FIG. 9.

End plug or manifold 168 has a plurality of through bores 180 each aligned with a respective one of the optical stems 72 and each having an inwardly tapered throat portion 182 adjacent the forward end wall 184 which terminates in an oval opening 185 as illustrated in FIG. 12. As in the previous embodiment, the inwardly tapering sides of throat portion 182 squeeze the forward end portion 95 of each sleeve member inwardly, closing off the through bore 96 and forming a straight line or slit-like, sealed closure 100.

The plug and receptacle units 122,120 are shown in a separate, unmated condition in FIGS. 9 and 10. In this condition, each chamber 35,84 containing optical contacts is sealed and the forward end portion 38,95 of each chamber is squeezed shut by the inwardly tapering throat portions 135, 182 of the respective actuator or plug members 130, 168. Although the oval openings of throat portions 182 are illustrated as extending generally parallel to one another in FIG. 12, they may alternatively be oriented as tangents to an imaginary circle or any other pattern, and it will be understood that the orientation on the plug and receptacle units will be matching.

Figure 14:
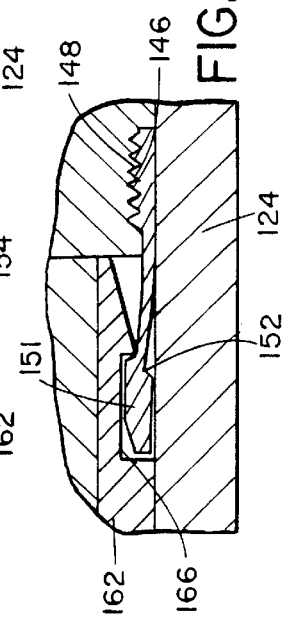
FIG. 14 is an enlargement of the encircled portion 14 of FIG. 13.

As the units 120, 122 are brought together, the forward end of receptacle shell 162 will enter the forward end of the bore 125. Enlarged portions 151 at the ends of fingers 150 of the locking collet 145 will snap engage in annular groove 166, as indicated in FIG. 14, to releasably secure the plug and receptacle units together with the forward end faces of the actuator or plug members 130,168 in face to face engagement, and the flat front end walls 109, 110 of the forward end portions of each bladder also in face-to-face engagement. The face-to-face engagement between the resilient end walls will form a seal.

Further movement of shell 162 inwardly will cause the fixed actuator or manifold to push actuator member 130 inwardly, compressing spring 132. At the same time, the forward end portion 38 of each fixed bladder 36 will push against the opposing forward end portion 95 of the aligned bladder or sleeve 82, causing each base member 85 and bladder to slide inwardly as a unit, compressing springs 90. Thus, both the forward end portions 38 and 95 of each of the aligned bladders will slide completely through the respective throat portions 135 and 182 into an enlarged diameter portion of the respective through bore 180, forcing the bores or apertures 40,96 to expand into the circular condition as indicated in FIG. 13.

Figure 13:
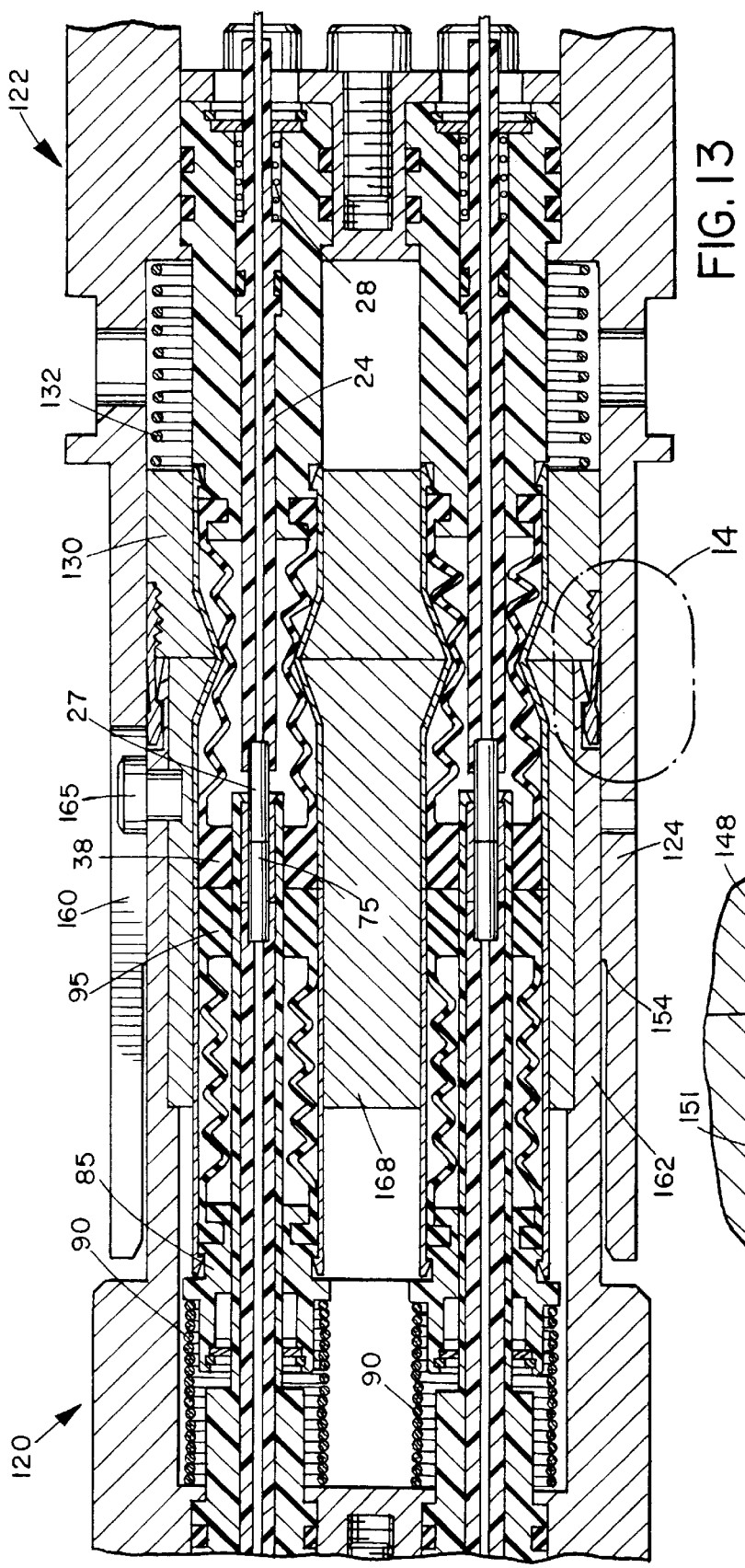
FIG. 13 is a sectional view showing the modules of FIGS. 9 and 10 interconnected.

At the same time, the mating forward end portions of each of the bladders will also slide rearwardly over the tubular extension 78 of optical stem 72, and the alignment sleeve 76 will engage over ferrule 27, bringing each pair of aligned optical ferrules 27,75 into face-to-face engagement, as illustrated in FIG. 13. Biasing spring 28 acting on each optical stem or housing 24 will ensure good face to face contact between the end faces of the ferrules. At all times, the two optical chambers 35,84 will be completely sealed and isolated from the external environment by the face-to-face engagement between the resilient end faces of portions 38 and 95. When the plug and receptacle units are disconnected, the process is reversed, with the spring 132 biasing the actuator ring 130 outwardly as the shell 162 is retracted, until each throat portion 135 again engages over the end portion 38 of the respective chamber 35 and squeezes the through bore or aperture 40 closed. At the same time, each base member 85 is urged outwardly by spring 90 as the end portion 95 is retracted away from the end portion 38 of the chamber 35, until the respective chamber end portions again engage with the throat portion 182 of the respective through bore 180, which squeezes each through bore 96 into the closed and sealed condition. The end faces 109,110 will be biased into face-to-face sealing engagement until the end portions are engaged in the respective throat portions and sealed, ensuring that the optical chambers are sealed at all times. The locking collet 130 engaging in groove 166 ensures that the end faces are held in sealing engagement until all the chambers are sealed, since the fingers 150 cannot move out of the groove until the forward portion of shell 162 is retracted past the step 154 in the plug unit bore 125. At this point, the fingers 150 are located in the enlarged forward end portion of the bore and can snap outwardly out of the locking groove. This location also corresponds to the point at which all the optical chambers will be sealed closed due to the throat portions 135,182 engaging and squeezing the chamber end portions shut.

FIGS. 15 and 16 illustrate a plug unit 200 of an alternative multiple circuit underwater connector, in which two or more circuits are grouped inside a single sleeve 202, rather than providing a separate sleeve for each circuit as in FIGS. 9 to 14. It will be understood that the mating receptacle unit (not illustrated) will have an equivalent number of circuits grouped in a single sleeve in a similar manner. The plug unit is otherwise identical to that of the previous embodiments, and like reference numerals have been used for like parts as appropriate.

In this embodiment, each sleeve 202 has a resilient, sealing end portion 204 of increased thickness and generally oval, rather than cylindrical, configuration. The remainder 205 of the sleeve is of thin-walled, bellows-like configuration as in the previous embodiments but is also of generally oval configuration and dimensions sufficient to accommodate the desired number of side-by-side circuits. End portion 204 has a generally oval through bore or opening 206. The open condition of opening 206 is illustrated in dotted outline in FIG. 15.

Plug unit 200 has a single end plug 16 having a plurality of through bores 28 through which the respective tubular housings 24 project into the chamber 34 inside sleeve 202. Optical fibers 26 extend through each of the housings 24 and are each terminated to alignment ferrule or probe 27. A cylindrical actuator or plug member 130 is slidably mounted in the bore 125 of the plug unit and is slidably biased by spring 132 into the fully extended position illustrated in FIG. 16. Unlike the previous embodiment, plug member 130 has only a single through bore 208 which has an inner or rear end portion 210 of generally oval cross section and a gradually tapering throat portion extending from rear portion 210 up to the forward, oval end opening 212. When the plug unit is not mated with the corresponding receptacle unit, the sealing end portion 204 is engaged in the tapered throat portion of the end plug member 130, which compresses opposing portions of the oval end portion 204 inwardly to force the opening into the sealed, slit-like condition 214 best illustrated in FIG. 15.

When the plug and receptacle units are mated together, in a similar manner to that illustrated in FIG. 13, the plug member or actuator 130 is forced inwardly, and the sealing end portion 204 of sleeve 202, along with the corresponding end portion of the receptacle sleeve, will be forced through the actuator throat and into an oval portion of the corresponding actuator in the receptacle unit, which will be of equivalent shape and dimensions to the rear portion 210 of the actuator 130 (see FIG. 15). The longer dimension of this oval portion will be less than the longest dimension of the compressed end portions of the two end seal portions of the sleeves, such that the compressed portions are forced inwardly, forcing the openings to open into the oval, open condition 206 and allowing the receptacle ferrules to pass through these openings in a similar manner to that illustrated in FIG. 13.

FIGS. 15 and 16 illustrate a two contact connector. Additional circuits may be readily accommodated simply by elongating the connector width.

Both the single circuit and multiple circuit connectors provide a much simpler sealing arrangement than prior art connector unit sealing arrangements. The same technique may be used for sealing single or multiple electrical connectors or hybrid connectors. It does not require anything protruding into the chamber end openings to seal them, nor any rotating seal members or external actuators to operate such seal members. All that is required is a suitable mechanism for opening and closing the chamber end faces. The resilient end portion of each optical chamber is simply squeezed shut when the units are unmated, and forced to open when the units are mated. The actuator for squeezing each chamber end face shut in the illustrated embodiment is a shaped, tapering, oval-shaped throat, and the end faces are designed to move through and away from the throats as the units are mated together, while being held in sealing, face-to-face engagement as their apertures open to allow the optical contact or contacts to pass through. Thus, the primary seal is provided by forcing the end faces of the end sealing portions tightly together, rather than by the seal members sealing against a penetrator.

Although some preferred embodiments of the invention have been described above by way of example only, it will be understood by those skilled in the field that modifications may be made to the disclosed embodiments without departing from the scope of the invention, which is defined by the appended claims.

I claim:

1. An underwater connector, comprising:

a plug unit having a forward end, a rear end, and a hollow body;

a first member mounted in the hollow body and forming an internal chamber, the member having a resilient forward end portion having an opening communicating with the internal chamber, at least one probe contact member mounted in the chamber in alignment with the opening;

a receptacle unit having a hollow body, a forward end, and a rear end and adapted for mating engagement with the plug unit;

a second member mounted in the hollow body of the receptacle unit and having an internal chamber and a resilient forward end portion having an opening communicating with the internal chamber, and at least one receptacle contact member in the chamber in alignment with the opening;

the resilient forward end portions of the members having forward end faces in face-to-face sealing engagement when the units are mated together; and the plug and receptacle units each having an actuator for compressing the resilient end portion of the respective member to close and seal the respective opening when the units are unmated, and for permitting opening of the respective openings when the plug and receptacle units are mated together with the end faces in sealing engagement, whereby at least one of the probe and receptacle contact members can pass through the aligned openings in the resilient end portions of the members to engage the other contact member.

2. The connector as claimed in claim 1, wherein at least one of the actuators further comprises means for forcing the respective openings to open.

3. The connector as claimed in claim 1, including a biasing device for urging the end faces into face-to-face sealing engagement when the units are mated together.

4. The connector as claimed in claim 1, wherein each actuator comprises a rigid, shaped throat having a forward end facing the opposing actuator as the units are mated together, each shaped throat having opposing, inwardly tapering portions extending up to the forward end for squeezing corresponding opposing portions of the opening of the respective forward end portion inwardly to close and seal the opening when the units are unmated.

5. The connector as claimed in claim 4, wherein the forward end of each shaped throat has an oval, slot-shaped end opening having a first, wider dimension along the length of the slot-shaped opening and a second, narrower dimension across the width of the slot-shaped opening, the narrower dimension being of predetermined size to squeeze the opening in the respective sleeve end portion into a closed and sealed condition.

6. The connector as claimed in claim 5, wherein one of the members is a sleeve movably mounted in the respective body for movement between an advanced position in which the forward end portion is engaged in the shaped throat and a retracted position rearward of the shaped throat of a first one of the actuators, and the other member is a sleeve that extends through both actuators into sealing engagement with the movable sleeve in the retracted position when the units are mated together, the first actuator having a bore portion adjacent the throat portion for engaging the forward end portions of both sleeves in the retracted position, the bore portion having a predetermined cross-sectional dimension at least in one direction which is less than said first dimension such that the openings in the two forward end portions are forced to open when the movable sleeve is retracted and the other sleeve extends through the throat portions into engagement with the movable sleeve.

7. The connector as claimed in claim 6, wherein each forward end portion and opening is of cylindrical shape, the forward end portions are squeezed by the respective throat portions into an oval shape having flattened opposite sides and outer rounded ends when the units are unmated and the openings are squeezed shut, and the bore portion is cylindrical and has a diameter less than said first dimension, whereby the opposite ends of the oval shape of each compressed end portion are forced inwardly by the bore portion to force the openings open.

8. The connector as claimed in claim 6, wherein each forward end portion and opening is of a first oval shape, the forward end portions are squeezed by the respective throat portions into a flatter oval shape having flattened opposite sides and outer rounded ends when the units are unmated and the openings are squeezed shut, and the bore portion is oval and has a longer cross-sectional dimension less than said first dimension, whereby the opposite ends of the oval shape of each compressed end portion are forced inwardly by the bore portion to force the openings open.

9. The connector as claimed in claim 1, wherein one of the actuators is slidably mounted in the respective body of a first one of the plug and receptacle units and is movable between an extended position in which it engages the respective end portion to squeeze the opening shut, and a retracted position in which it is pushed back over the end portion to allow the opening to open.

10. The connector as claimed in claim 9, wherein the member in the other, second unit is slidably mounted for movement between an extended position in which the resilient end portion is engaged in the actuator and the opening is squeezed shut, and a retracted position in which the resilient end portion is retracted from the actuator and allowed to open, the respective slidable actuator and members moving into their retracted positions when the units are mated together.

11. The connector as claimed in claim 1, wherein each actuator has a forward end and at least one through bore in which the forward end portion of the respective member engages, the bore having an inwardly tapering throat portion extending up to the forward end to squeeze the opening of the resilient end portion of the respective member into the sealed and closed condition.

12. The connector as claimed in claim 1, wherein the throat portion is of tapering, oval shaped cross-section and has opposing flat sides for squeezing the respective opening into a slit-like closure.

13. The apparatus as claimed in claim 1, including a plurality of probe contact members mounted in the chamber of the first member, and a corresponding number of mating receptacle contact members mounted in the chamber of the second member.

14. The apparatus as claimed in claim 1, including a plurality of first members mounted in the hollow body of the plug unit, a probe contact member mounted in each of the first members, and a corresponding number of second members mounted in the hollow body of the receptacle unit, a receptacle contact member mounted in each of the second members, the second members each being aligned with a respective one of the first members as the units are mated together, each actuator engaging over the forward end portions of each of the respective members to close and seal the openings when the units are unmated.

15. The apparatus as claimed in claim 14, wherein each actuator has a plurality of through bores for slidably receiving the respective members, each through bore having a forward, tapered throat portion for squeezing the openings in the forward end portions of the members into a closed, sealed condition.

16. The apparatus as claimed in claim 1, wherein each member has a flexible bellows portion extending rearwardly from said forward end portion and surrounding said chamber, said chamber being fluid-filled, and the flexible bellows portion being expandible and contractible for pressure and volume compensation.

17. The apparatus as claimed in claim 16, wherein each of said units has a rear end plug mounted in the respective hollow body, one of said plugs being secured in said hollow body and the other plug being movably mounted in said hollow body for movement between an extended position and a retracted position, each of said members having a rear end secured to the respective rear end plug, and the rear end plug having at least one through bore, a contact member stem extending through said end plug bore into said chamber, the stem having a forward end, and the contact member being mounted at the forward end of the stem, and a cover extending over each member, the cover having a first end secured to the forward end portion of the respective member and a rear end secured to the rear end plug, the members and covers having co-axial longitudinal axes, and the cover member being of a material which resists collapse in the longitudinal direction and which is radially resilient.

18. The apparatus as claimed in claim 1, wherein each of said contact members comprises an optical contact, each body having a rear end plug, an optical stem extending through said rear end plug into the respective chamber, the optical contact being secured to the optical stem and having a forward end face for optical connection to the forward end face of the contact in the other unit, and at least one of said rear end plugs having a tubular extension extending forwardly around said stem to a location spaced forwardly from said forward end face.

19. The apparatus as claimed in claim 18, wherein said forward extension is provided at least in said receptacle unit, the receptacle contact member including an alignment sleeve projecting forwardly from the forward end face of the optical contact for aligning the optical contact of the plug unit with the optical contact of the receptacle unit when the units are mated together, the forward extension projecting over said alignment sleeve and having a forward end with an inturned rim for retaining said alignment sleeve.

20. The apparatus as claimed in claim 19, including a base member slidably mounted in said receptacle hollow body in sliding engagement over said forward extension, the second member having a rear end secured to said base member, the base member being movable between an extended position in which the forward end portion of said second member engages in said actuator and the opening is closed, and a retracted position in which the forward end portion is retracted rearwardly from said actuator and said opening is open, and a biasing device between said rear end plug and base member for biasing said end plug into said extended position.

21. The apparatus as claimed in claim 20, including a sliding seal member between said base member and forward extension.

22. An underwater connector, comprising:
a plug unit having a forward end, a rear end, and a hollow body;
a first member mounted in the hollow body and having an internal chamber with a sealed rear end, and a forward end portion having an opening and a forward sealing face;
at least one probe contact mounted in the internal chamber in alignment with the opening;
a receptacle unit having a forward end, a rear end, and a hollow body;
a second member mounted in the hollow body of the receptacle unit and having an internal chamber, a sealed rear end, and a forward end portion having an opening and a forward sealing face;
at least one receptacle contact mounted in the internal chamber of the receptacle unit in alignment with the opening at the forward end portion of the second member;
at least one of the contact and member of one of the units being relatively movable whereby the contact is movable between a first position within the internal chamber and a second position projecting out of the forward end portion and into the internal chamber of the other member for engagement with the contact in the other member when the units are mated together;
the forward sealing faces of the members being in face-to-face sealing engagement to provide a primary seal when the units are mated together and the contacts are engaged; and
the openings in the end portions being sealed when the units are unmated and opened when the forward end faces are in sealing engagement, whereby the movable contact passes through the openings into contact with the other contact;
wherein each unit has an actuator for compressing the forward end portion of the respective member when the units are unmated to close and seal the respective opening.

23. The connector as claimed in claim 22, including a biasing device for biasing said forward sealing faces into face-to-face sealing engagement.

24. The connector as claimed in claim 22, wherein the actuator and forward end portion of each member in each of the units are relatively movable between a first position in which the forward end portion is positioned within the actuator and the opening is closed and sealed, and a second position in which the forward end portion is spaced from the actuator and the opening is open.

25. The connector as claimed in claim 24, including an opening mechanism for forcing said opening to open when the forward end portion moves to said second position.

26. The connector as claimed in claim 25, wherein at least one actuator comprises a shaped rigid throat for compressing the end portion into a flattened oval condition with the opening closed and sealed, and the opening mechanism comprises a shaped rearward extension of said throat of predetermined cross-sectional shape for forcing the outer ends of said flattened oval end portion inwardly and forcing said opening to open.

27. The connector as claimed in claim 24, wherein one of said actuators is fixed in the respective unit and the other actuator is slidably mounted in said other unit for movement between an advanced position engaging and closing the respective end portion, and a retracted position positioned rearwardly of said end portion, the end portion engaging said movable actuator being fixed in position and the member engaging said fixed actuator being movable between an extended position in which the end portion of said movable member is engaged in said fixed actuator and closed, and a retracted position in which the end portion is retracted rearwardly from said fixed actuator and the opening is open, the movable member being biased towards said extended position.

28. An underwater connector, comprising:

a plug unit having a forward end, a rear end, and a hollow body;

a first member mounted in the hollow body and forming an internal chamber, the chamber having a forward end opening, at least one probe contact element mounted in the chamber in alignment with the opening;

a first sealing device at the forward end opening of said chamber;

a receptacle unit having a hollow body, a forward end, and a rear end and adapted for mating engagement with the plug unit;

a second member mounted in the hollow body of the receptacle unit and having a second internal chamber, the second chamber having a forward end opening communicating with the internal chamber, and at least one receptacle contact element in the chamber in alignment with the opening;

a second resilient sealing device at the forward end opening of the second chamber;

each sealing device comprising a resilient element having a through bore communicating with the respective chamber opening and a forward end face and being capable of adopting an open position in which the through bore is open and a closed position in which the through bore is closed and sealed to seal the respective chamber opening;

the forward end faces of the resilient elements being in face-to-face sealing engagement when the units are mated together; and the plug and receptacle units each having an actuator for compressing the resilient elements to close and seal the respective through bore when the units are unmated, and for permitting opening of the respective through bores when the plug and receptacle units are mated together with the end faces in sealing engagement, whereby at least one of the probe and receptacle contact elements can pass through the aligned through bores in the resilient elements and into the respective chamber to engage the other contact member.

29. The connector as claimed in claim 28, wherein each resilient element is formed integrally with the respective first or second member.

* * * * *

UNITED STATES PATENT AND TRADEMARK OFFICE
CERTIFICATE OF CORRECTION

PATENT NO. : 6,315,461 B1
DATED : November 13, 2001
INVENTOR(S) : James L. Cairns It is certified that error appears in the above-identified patent and that said Letters Patent is hereby corrected as shown below:

<u>Column 14,</u>
Line 44, replace "1" with -- 11 --

Signed and Sealed this

Third Day of September, 2002

Attest:

Attesting Officer

JAMES E. ROGAN
*Director of the United States Patent and Trademark Office*